US008159617B2

(12) United States Patent
Neal

(10) Patent No.: US 8,159,617 B2
(45) Date of Patent: Apr. 17, 2012

(54) UNIVERSAL, HIGHLY CONFIGURABLE VIDEO AND GRAPHIC MEASUREMENT DEVICE

(75) Inventor: Greg Neal, Morgan Hill, CA (US)

(73) Assignee: Genesis Microchip Inc., Santa Clara, CA (US)

( * ) Notice: Subject to any disclaimer, the term of this patent is extended or adjusted under 35 U.S.C. 154(b) by 1240 days.

(21) Appl. No.: 11/768,667

(22) Filed: Jun. 26, 2007

(65) Prior Publication Data
US 2008/0122979 A1 May 29, 2008

Related U.S. Application Data

(60) Provisional application No. 60/816,721, filed on Jun. 26, 2006.

(51) Int. Cl.
*H04N 5/52* (2006.01)
(52) U.S. Cl. .......................... 348/678; 348/576; 348/558
(58) Field of Classification Search .......... 348/678–686, 348/576, 558
See application file for complete search history.

(56) References Cited

U.S. PATENT DOCUMENTS

| | | | |
|---|---|---|---|
| 4,101,961 A | 7/1978 | Reiber | |
| 4,577,235 A | 3/1986 | Kannapell et al. | |
| 4,612,482 A | 9/1986 | Beamon, III et al. | |
| 5,418,574 A | 5/1995 | Miyabata et al. | |
| 5,546,474 A | 8/1996 | Zuniga | |
| 5,742,704 A | 4/1998 | Suzuki et al. | |
| 5,847,773 A | 12/1998 | Lagoni et al. | |
| 6,393,148 B1 | 5/2002 | Bhaskar | |
| 7,064,794 B2 * | 6/2006 | Filliman et al. | 348/678 |
| 7,379,594 B2 | 5/2008 | Ferman et al. | |
| 7,483,081 B2 | 1/2009 | Wu | |
| 2003/0179238 A1 * | 9/2003 | Roh | 345/767 |
| 2004/0161152 A1 | 8/2004 | Marconi et al. | |
| 2005/0002566 A1 | 1/2005 | Di Federico et al. | |
| 2005/0128358 A1 | 6/2005 | Nakajima et al. | |
| 2005/0163372 A1 | 7/2005 | Kida et al. | |
| 2005/0190980 A1 | 9/2005 | Bright | |
| 2006/0239581 A1 | 10/2006 | Neuman | |
| 2007/0071334 A1 | 3/2007 | Sakaue | |

FOREIGN PATENT DOCUMENTS

| | | |
|---|---|---|
| EP | 0 613 294 | 8/1994 |
| EP | 0957631 | 11/1999 |
| EP | 1 333 665 | 8/2003 |
| EP | 1 560 417 | 8/2005 |
| GB | 2 418 316 | 3/2006 |
| WO | 9533337 | 12/1995 |
| WO | 0063838 | 10/2000 |
| WO | 0141117 | 6/2001 |

OTHER PUBLICATIONS

European Search Report dated Sep. 25, 2007 in EP Application No. 07252589.2.
Notice of Allowance dated Dec. 2, 2010 in U.S. Appl. No. 11/613,009.

(Continued)

*Primary Examiner* — Michael Lee
(74) *Attorney, Agent, or Firm* — Beyer Law Group LLP

(57) ABSTRACT

An apparatus and method for processing a video signal includes means for receiving the video signal, means for analyzing the video signal based upon a user supplied set of instructions, means for processing the video signal in accordance with the analysis, and means for outputting the processed video signal.

15 Claims, 2 Drawing Sheets

OTHER PUBLICATIONS

Notice of Allowance dated Oct. 1, 2010 in U.S. Appl. No. 11/565,464.
Office Action dated Sep. 23, 2010 in U.S. Appl. No. 11/613,009.
Office Action dated Jul. 12, 2010 in U.S. Appl. No. 11/565,464.
Notice of Allowance dated Jun. 29, 2010 in U.S. Appl. No. 11/525,276.
Office Action dated Apr. 23, 2010 in U.S. Appl. No. 11/613,009.
Office Action dated Apr. 13, 2010 in U.S. Appl. No. 11/525,276.
Office Action dated Mar. 11, 2010 in U.S. Appl. No. 11/565,464.
Office Action dated Sep. 30, 2009 in U.S. Appl. No. 11/525,276.
European Search Report dated Jan. 14, 2008 in EP Application No. 07252590.0.
Partial Search Report dated Oct. 18, 2007 in Application No. 07252590.0.
Dimitrova et al., "On Selecting Video Content Analysis and Filtering", Proceedings of the SPIE, SPIE, vol. 3972, Jan. 26, 2000, pp. 359-368.
Goh, K. H. et al., "Automatic Video Contrast Enhancement", Consumer Electronics, 2004 IEEE International Symposium on Reading, UK, Sep. 1-3, 2004, pp. 359-364.
Search Report and Written Opinion dated Nov. 17, 2008 in Singapore Patent Application No. 0704764-0.
European Search Report dated Jan. 7, 2009 in EP Application No. 07252588.4.
European Search Report dated Jan. 7, 2009 in EP Application No. 07252587.6.
Search Report and Written Opinion dated Oct. 28, 2008 in Singapore Patent Application No. 0704723-6.
Office Action dated Aug. 9, 2011 in U.S. Appl. No. 12/979,261.

* cited by examiner

UNIVERSAL, HIGHLY CONFIGURABLE VIDEO AND GRAPHIC MEASUREMENT DEVICE

CROSS REFERENCE TO RELATED APPLICATIONS

This patent application takes priority under 35 U.S.C. 119 (e) to (i) U.S. Provisional Patent Application No. 60/816,721, filed on Jun. 26, 2006 entitled "UNIVERSAL, HIGHLY CONFIGURABLE VIDEO AND GRAPHIC MEASUREMENT DEVICE" by Neal. This application is also related to the following co-pending U.S. Patent applications, each of which are herein incorporated by reference, (i) U.S. patent application Ser. No. 11/525,276, filed Sep. 21, 2006 , entitled "INTEGRATED HISTOGRAM AUTO ADAPTIVE CONTRAST CONTROL (ACC)" naming Neal as inventor; (ii) U.S. patent application Ser. No. 11/613,009 filed Dec. 19, 2006 , entitled "VIDEO CONTENT DETECTOR" naming Neal as inventor; and (iii) U.S. patent application Ser. No. 11/565,464 filed Nov. 30, 2006, entitled "VIDEO WINDOW DETECTOR", naming Neal as inventor.

BACKGROUND

1. Field of the Invention

This invention generally relates to improving video and graphics quality.

2. Description of Related Art

A display device renders input data as a two-dimensional image in color or grayscale. The input data may be graphical in nature. An example of such a device is a PC display monitor. The input data may be a video signal. An example of such a device is a TV or video monitor. The input data may be a combination of graphics and embedded video. An example of such a device is a PC display monitor displaying graphics with one or applications displaying video in a window, or a PC/TV display device with two or more input ports displaying graphics or full-screen video or a combination of graphics and video, e.g. Picture-in-Picture.

A viewer typically manually controls the color and contrast of a display device. The issue with manual control is that it does not result in optimal display quality for all possible input data. For example, setting the contrast control to increase the contrast of a washed out image will result in over-contrasted images for a normal image. Decreasing the color saturation setting for a highly saturated image would be optimal, but if the input changes to a de-saturated image, this setting would now be sub-optimal. It is not feasible or convenient for a viewer to continuously change display settings to adapt to the nature of the input image, particularly when the input is a video sequence.

Another problem with manual control of contrast and color is that it is not sensitive to the nature of the input data. Manual contrast control applies a multiplicative factor to the input luma component. Due to the finite dynamic range of luma values, increasing the contrast of a dark image in order to be able to see the shadow details results in loss of information in the bright highlights. The multiplicative nature of this control also implies that there is no possibility of increasing the contrast of a predominantly bright image.

In order to apply image improvement effects to graphics or video images it is necessary to know the nature of the image content. In order to correctly display graphics or video material on a flat panel display, various qualities of the material have to be measured. Implementing digital electronics for each of these measurements can be wasteful.

Therefore, what is needed is a universal, highly configurable measurement device that is more adaptive, flexible, and efficient.

SUMMARY OF THE INVENTION

Broadly speaking, the invention relates to increasing the contrast for luminance levels that occur in significant areas of the image. The invention can be implemented in numerous ways, including as a method, system, device, apparatus, or computer readable medium. Several embodiments of the invention are discussed below.

In one embodiment, a method of processing a video signal includes at least the following operations, receiving the video signal, analyzing the video signal based upon a user supplied set of instructions, processing the video signal in accordance with the analysis; and outputting the processed video signal.

In another embodiment, an apparatus for processing a video signal includes means for receiving the video signal, means for analyzing the video signal based upon a user supplied set of instructions, means for processing the video signal in accordance with the analysis, and means for outputting the processed video signal.

Other aspects and advantages of the invention will become apparent from the following detailed description taken in conjunction with the accompanying drawings.

DETAILED DESCRIPTION OF SELECTED EMBODIMENTS

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

Figure 1:
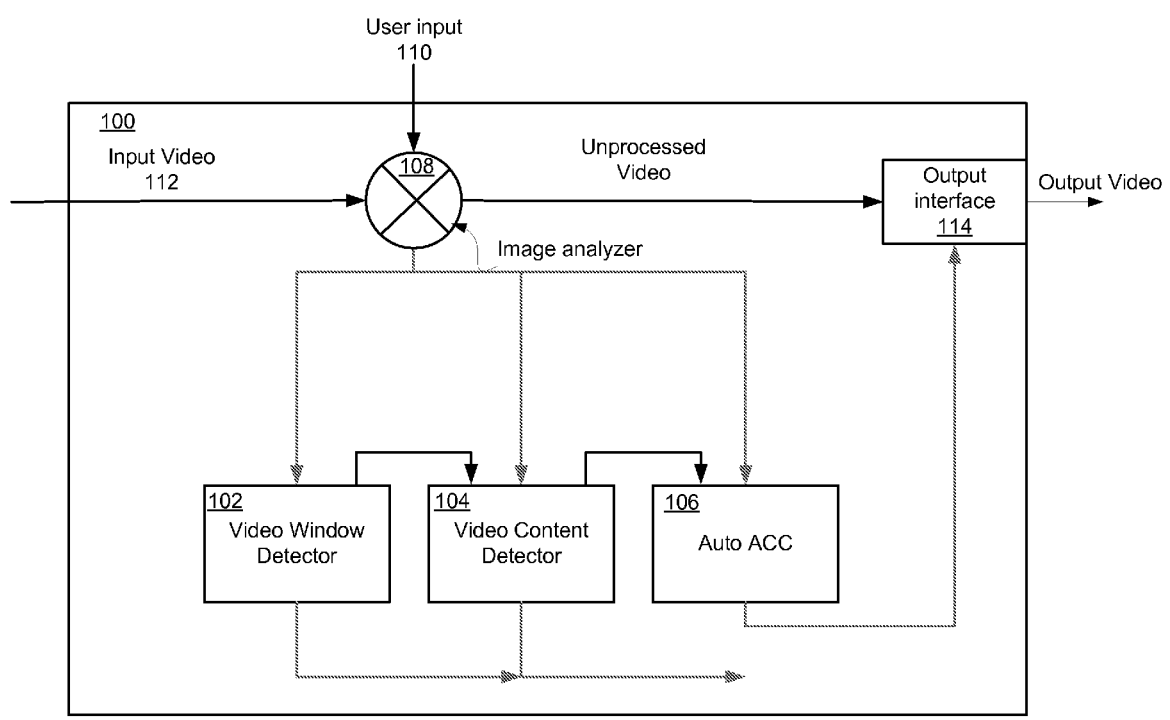
FIG. 1 shows a system in accordance with an embodiment of the invention.

The purpose of the invention is to provide a universal, highly configurable measurement device that is more adaptive, flexible, and efficient an example of which is illustrated in FIG. 1 as measurement device 100. As illustrated, measurement device 100 includes, video window detector 102 (described in more detail in U.S. patent application Ser. No. 11/565,464, entitled "Video Window Detector" filed Nov. 30, 2006 which is incorporated by reference in its entirety for all purposes and which in FIG. 9-10 discloses determining an estimate of a size and location of the video window by identifying evaluation rectangles in which there is a transition from a substantially synthetic image to the real image corresponding to an edge between the real image and the background), video content detector 104 (described in more detail in U.S. patent application Ser. No. 11/613,009, entitled "Video Content Detector" filed Dec. 19, 2006 which is incorporated by reference in its entirety for all purposes and which discloses in FIG. 1 classifying an image based on the image realness value into one of at least three different image categories, including a real image, a synthetic image, and a mixed image), and automatic adaptive contrast control 106

(described in more detail in U.S. patent application Ser. No. 11/525,276, entitled "Integrated Histogram Auto Adaptive Contrast Control" filed Sep. 21, 2006 which is incorporated by reference in its entirety for all purposes which describes in paragraph [0011] adaptive contrast control that includes receiving video frame formed of a plurality of pixels each having associated pixel data, generating an integrated luminance histogram for the received video frame data, generating a transfer function in accordance with the integrated luminance histogram, and updating the video frame data using the transfer function) each of which coupled to image analyzer 108. In the described embodiment, user provided input instruction 110 are input to image analyzer 108 that, in turn, uses the received input instructions 110 to analyze input video stream 112. Based upon the analysis, input video stream 112 is forwarded to any or each of video window detector 102, video content detector 104, and automatic ACC 106 for appropriate processing. Once appropriately processed, the processed video stream is output to output interface 114. In some cases, image analyzer 108 determines that no additional image processing is to be performed on input video stream 112 that is, in this case, simply passed through to output interface 114 without additional processing.

Figure 2:
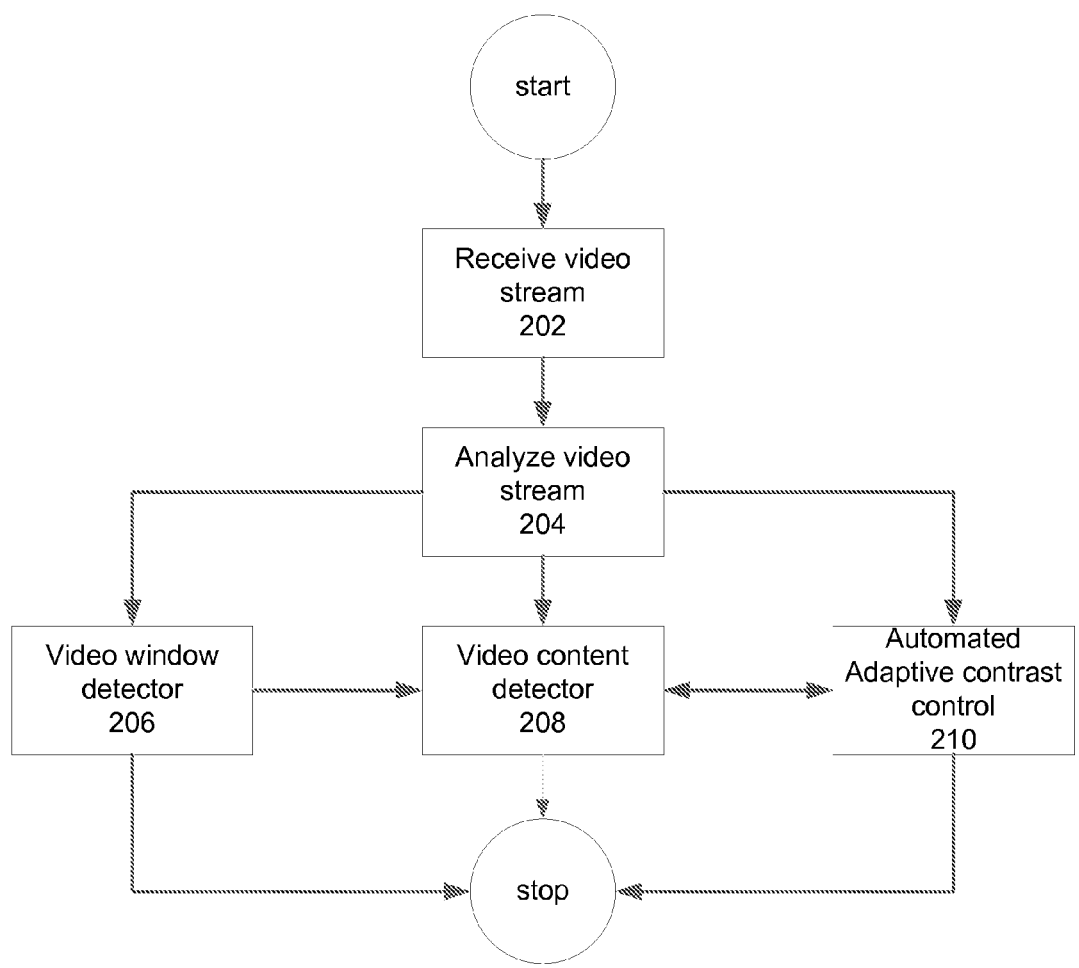
FIG. 2 shows a flowchart detailing a process in accordance with an embodiment of the invention.

FIG. 2 illustrates a process 200 in accordance with an embodiment of the invention. The process 200 begins at 200 by receiving a video stream at 202 and based upon a user supplied set of instructions that can be used by an image analyzer to analyze the video stream at 204. Based upon the analysis, the video stream can be forward for further processing directly to video window detector at 206, video content detector at 208, and/or automatic adaptive contrast control at 210. It should be noted, however, that based upon the analysis, video stream can remain unprocessed and be passed directly to output at 212. In any case, once either the video stream is processed (or unprocessed as the case may be), the video stream is output at 212. In some cases, the video stream can undergo conditional processing in that the video stream can be processed by, for example, the adaptive contrast control first, followed by other processing such as video window detector. In this way, the invention provides for an integrated approach to processing a video stream that can be implemented as, for example, a single integrated circuit thereby greatly reducing the time to manufacture, cost of manufacture, and overall cost.

Embodiments of the invention, including the apparatus disclosed herein, can be implemented in digital electronic circuitry, or in computer hardware, firmware, software, or in combinations of them. Apparatus embodiments of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. Embodiments of the invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other embodiments are within the scope of the following claims.

What is claimed is:

1. A method of processing a video signal, comprising:
receiving the video signal;
analyzing the video signal based upon a user supplied set of instructions;
processing the video signal in accordance with a configurable process flow based on the analysis, including performing as sub-processes:
  detecting co-ordinates of a video window, if any, as required by the analysis;
  determining a content type of the video in the window if required by the analysis; and
  automatically performing adaptive contrast control as required, if any, by the analysis; and
  outputting the processed video signal;
  wherein determining the content type includes classifying an image based on an image realness value into one of at least three different image categories, including a real image, a synthetic image, and a mixed image.

2. A method as recited in claim 1, wherein the processing comprises:
performing conditional processing in which the configurable process flow has an order of sub-processes is based on the analysis.

3. A method as recited in claim 2, wherein the method further comprises:
outputting unprocessed video if the analysis determines no processing is required.

4. A method as recited in claim 3, wherein the method is performed by a single integrated circuit.

5. A method as recited in claim 1, wherein the method is performed by a single integrated circuit.

6. A measurement device for processing a video signal including an integrated circuit having at least one processor, comprising:
an image analyzer for receiving the video signal and analyzing the video signal based upon a user supplied set of instructions;
a video window detector detecting co-ordinates of a video window, if any, as required by the analysis;
a video content detector determining a content type of the video in the window if required by the analysis if a video window is detected;
n adaptable contrast control automatically performing adaptive contrast control as required, if any, by the analysis; and an output interface for outputting the processed video signal;

wherein the processing performed by the measuring device is configurable based on the analysis performed by the image analyzer;

wherein the video content detector classifies an image based on an image realness value into one of at least three different image categories, including a real image, a synthetic image, and a mixed image.

7. A measurement device for processing a video signal including an integrated circuit having at least one processor, comprising:

an image analyzer for receiving the video signal and analyzing the video signal based upon a user supplied set of instructions;

a video window detector detecting co-ordinates of a video window, if any, as required by the analysis;

a video content detector determining a content type of the video in the window if required by the analysis if a video window is detected;

an adaptable contrast control automatically performing adaptive contrast control as required, if any, by the analysis; and an output interface for outputting the processed video signal;

wherein the processing performed by the measuring device is configurable based on the analysis performed by the image analyzer;

wherein the video window detector determines an estimate of a size and location of the video window by identifying evaluation rectangles in which there is a transition from a substantially synthetic image to the real image corresponding to an edge between the real image and the background.

8. A measurement device for processing a video signal including an integrated circuit having at least one processor, comprising:

an image analyzer for receiving the video signal and analyzing the video signal based upon a user supplied set of instructions;

a video window detector detecting co-ordinates of a video window, if any, as required by the analysis;

a video content detector determining a content type of the video in the window if required by the analysis if a video window is detected;

an adaptable contrast control automatically performing adaptive contrast control as required, if any, by the analysis; and an output interface for outputting the processed video signal;

wherein the processing performed by the measuring device is configurable based on the analysis performed by the image analyzer;

wherein the adaptive contrast control generates an integrated luminance histogram for the received video frame data, generates a transfer function in accordance with the integrated luminance histogram, and updates the video frame data using the transfer function.

9. The measurement device of claim 6, wherein the apparatus is incorporated into a single integrated circuit.

10. The measurement device of claim 7, wherein the apparatus is incorporated into a single integrated circuit.

11. The measurement device of claim 8, wherein the apparatus is incorporated into a single integrated circuit.

12. A method of processing a video signal, comprising:
receiving the video signal;
analyzing the video signal based upon a user supplied set of instructions;
processing the video signal in accordance with a configurable process flow based on the analysis, including performing as sub-processes:
  detecting co-ordinates of a video window, if any, as required by the analysis;
  determining a content type of the video in the window if required by the analysis; and
  automatically performing adaptive contrast control as required, if any, by the analysis; and
outputting the processed video signal;
wherein detecting co-ordinates of a video window includes determining an estimate of a size and location of the video window by identifying evaluation rectangles in which there is a transition from a substantially synthetic image to the real image corresponding to an edge between the real image and the background.

13. A method as recited in claim 12, wherein the method is performed by a single integrated circuit.

14. A method of processing a video signal, comprising:
receiving the video signal;
analyzing the video signal based upon a user supplied set of instructions;
processing the video signal in accordance with a configurable process flow based on the analysis, including performing as sub-processes:
  detecting co-ordinates of a video window, if any, as required by the analysis;
  determining a content type of the video in the window if required by the analysis; and
  automatically performing adaptive contrast control as required, if any, by the analysis; and
outputting the processed video signal;
wherein performing adaptive contrast control includes generating an integrated luminance histogram for the received video frame data, generating a transfer function in accordance with the integrated luminance histogram, and updating the video frame data using the transfer function.

15. A method as recited in claim 14, wherein the method is performed by a single integrated circuit.

* * * * *